US 6,654,758 B1

United States Patent
Teague

(10) Patent No.: US 6,654,758 B1
(45) Date of Patent: Nov. 25, 2003

(54) METHOD FOR SEARCHING MULTIPLE FILE TYPES ON A CD ROM

(75) Inventor: Tommy Kay Teague, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 377 days.

(21) Appl. No.: 09/620,614

(22) Filed: Jul. 21, 2000

(51) Int. Cl.[7] .................................................. G06F 7/00
(52) U.S. Cl. ..................... 707/101; 715/501.1; 715/523
(58) Field of Search .......................... 707/2, 3, 10, 101, 707/104.1; 715/500.1, 501.1, 523

(56) References Cited

U.S. PATENT DOCUMENTS 6,336,124 B1 * 1/2002 Alam et al. .................. 707/523
6,393,442 B1 * 5/2002 Cromarty et al. ........... 707/523
6,415,278 B1 * 7/2002 Sweet et al. .................... 707/2
6,415,307 B2 * 7/2002 Jones et al. .................. 707/525

OTHER PUBLICATIONS

"Hypertext Document Update", IBM Technical Disclosure Bulletin, Jan. 1, 1992.*

* cited by examiner

Primary Examiner—Sam Rimell
(74) Attorney, Agent, or Firm—Alfred W. Kozak; Nathan Cass; Lise A. Rode

(57) ABSTRACT

While multiple different document files on a CD-ROM can occur in several different file formats, there is no efficient way to topic-search these differently formatted files since search engines can only operate on one particular type of formatted file. The present method operates to convert the multiple file formats into one common file format (Portable Document Format) which then can be suitably searched by a browser program, such as Adobe Acrobat.

9 Claims, 12 Drawing Sheets

CREATION OF TEXT COPIES AS PDF

SEARCHING NON-PDF FILES

CONVERTING WINDOWS HELP FILE TO RTF

CONVERTING HTML HELP (CHM) FILES TO RTF

CONVERTING RTF FILE TO PDF

SEARCHING MULTIPLE FILE TYPES VIA PDF COPIES

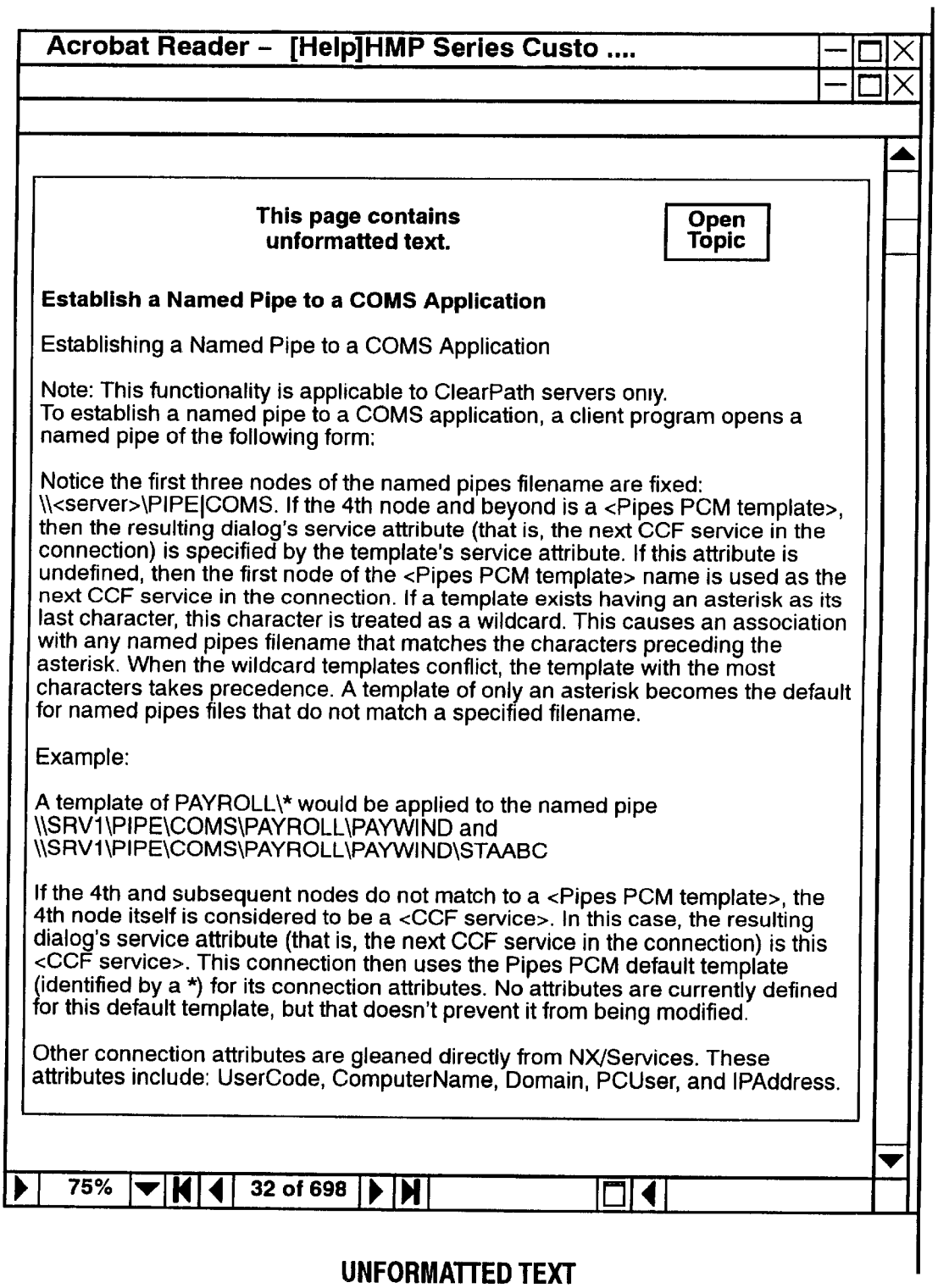
UNFORMATTED TEXT
Figure 10a
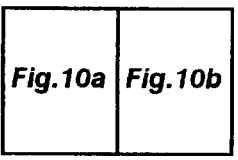

METHOD FOR SEARCHING MULTIPLE FILE TYPES ON A CD ROM

CROSS-REFERENCES TO RELATED APPLICATIONS

This application is related to a application, U.S. Ser. No. 09/620,615 entitled "Method of Providing Duplicate Original File Copies of a Searched Topic From Multiple File Types Derived From the Web", which is incorporated by reference herein.

FIELD OF THE INVENTION

The present disclosure involves methods for developing full text searches for searching multiple file types which are distributed on a CD CACHE ROM.

BACKGROUND OF THE INVENTION

In present day commercial situations, many digital development software and computer companies work to deliver documentation to their customers in a number of different formats. These formats may show up in a number of different varieties, that is to say the document format may be on paper, for example, or Adobe Acrobat Portable Document Format (PDF) files, or Windows Help files, or Hypertext Markup Language (HTML) and also HTML help files.

The documentation provided to receivers, such as customers, is distributed and made available on, for example, paper documents, on CD ROMs, and on Web Servers.

Of course, it is desirable for a recipient or user to make a full text search of the received documents. However, users cannot perform full-text searches on paper documents, except through long, laborious reading and surveys of the documents. There is, however, software designated as "search engines" that exist in digital technology in order to search files that are distributed on CD ROMs.

However, these search engines are limited in a number of ways in providing search capability when the document or CD ROM involves multiple file types. Most of the existing search engines are designed only to search files of one particular format.

In this type of situation, then it would be necessary to convert all files in the documentation or CD ROM into a common format. This common format would be the format which was compatible with the particular search engine available.

However, when files are converted into a format different from that in which they were originally created, much of the functionality for searching the original file is lost, and this includes navigating through the file and finding certain content in the file.

There are other types of search engines which are capable in a certain limited way of including search operations for multiple file types in the documentation or CD ROM. However, these are unable to open all the file types at locations where the search terms appear and then be capable of moving from one such location to the next location within the document.

Thus, these other types of search engines require that the user first search with one particularly favorite engine and then refine the search using another search engine designed for the file type.

One example of a standard (not a full-text) search is what one can do in a product such as Word. The operator tells Word to find a text string. Then Word starts reading the text in the document by reading each word one at a time beginning at a specified location and comparing the text against the string that was entered. Now, when Word finds a "hit" (match), then Word highlights the text and stops searching. If the operator chooses "Find Next" option, then the Word program repeats the process and continues the search beginning just past the current hit. However, this is considered pretty much of a brute force and slow process of operation.

A "full text" search, however, works to search a collection of files at one time. It accomplishes this by using an auxiliary collection of files that was created ahead of time and then distributed with the files that are to be searched. If, for example, the operator wished to search 450 files for the word "server," the software would then read the auxiliary files which will already know all occurrences and locations of the word "server." Here the software would present the operator with a "hit list" of all files that contained the word that is built from the information in the auxiliary files. If the operator elects to open up any of these files, the software will then open the file, move to the first location in the file (which it already knows from the auxiliary file), and then highlight the word. It may be noted that none of the files are directly searched or scanned. By using such a file, the operator or user can utilize advanced features such as wild cards ("install*") and Boolean operators ("installation and not printers").

There are a number of ways to create these auxiliary files. Such a process may take several hours for most of releases to be made on CD-ROM. The success of a "search engine" can be measured by how efficiently the desired files are generated and accessed.

The present invention provides for the use of an existing search engine that is designed to support the searching of one particular file format (PDF, or Adobe® Acrobat® files). This can then be extended to allow the searching of virtually any other type of file format such as HTML, HTML Help, or Windows Help. The method and system accomplishes this by creating a PDF file "duplicate" consisting of the text from the file that the operator wants to search in order to allow the search engine to find the text in the duplicate that was created. Here then there is provided a link from each page in the PDF duplicate into the corresponding location in the file of the other format so that the user-operator has now essentially performed a full-text search in that file.

SUMMARY OF THE INVENTION

The present method and system involves a technique that is used to search the Portable Document Format (PDF) files that contain the text extracted from files residing in other formats such as Windows Help, Hypertext Markup Language (HTML) Help, and HTML.

On each page of the PDF file there are hyperlinks that the user can select to open the original file at the corresponding location.

The method enables the user to search the collection of PDF files, including both files that were created as PDF files as well as the PDF files created from the text extracted from the files of other formats. The method uses the search engine from Verity that is distributed by Adobe® in order to search the Adobe® Acrobat® portable document format files on a CD ROM. If the search targets include files of formats other than PDF, then the user is presented with pages within the PDF copy of the file in which the target text appears.

The user can navigate within the PDF copy using the "next hit" and "previous hit" program options. The text is visible to the user and is sufficient to help the user determine whether it is necessary or helpful to access the original file.

Each page of the PDF file carries a "button" then, when selected, opens the document in the original format at the location corresponding to the location displayed in the PDF copy. Both the PDF copy and the original file are accessible at the same time so it is possible to identify the location of the hits within the file and to find additional hits in the complete collection of files.

The indicated method includes software which is used to extract the text from Windows Help, HTML, and HTML Help files, and then create from that text the new files that can be converted by the standard Adobe software into PDF files with corresponding explanatory messages and buttons on every page in order to support the linking into the corresponding locations within the original files.

This method then provides the ability to link from the hits displayed in Adobe Acrobat into the corresponding locations within the original files.

GLOSSARY LIST

Figure 1A:
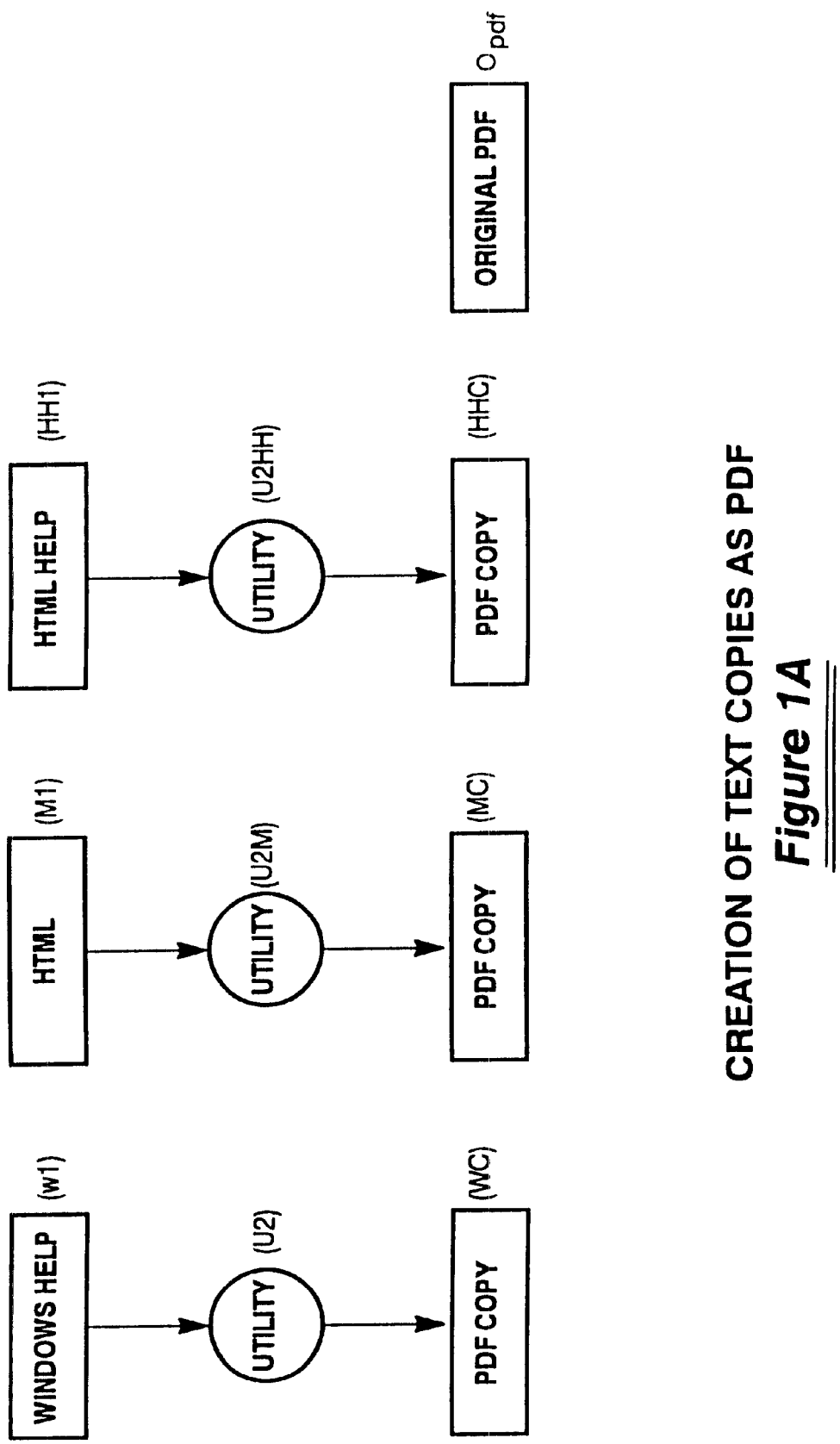
FIG. 1A is a generalized schematic drawing showing how files in various formats are converted by a utility program into a Portable Document Format (PDF) files.

ACTIVEX CONTROL: This is Windows software. It often has a visual element, either at design time or run time. ActiveX controls also have the ability to communicate some other program types, such as Microsoft Internet Explorer.

ACROBAT: This is document exchange software from Adobe Systems Incorporated of Mountain View, Calif. that runs on DOS, Windows, Unix, and Macintosh computers. It allows documents created on one platform to be displayed and printed exactly the same on another platform. Documents are converted into the Acrobat PDF (portable data format) which contains all the information about the appearance of the document.

ADOBE ACROBAT DISTILLER: This is a software program that is part of the Adobe Acrobat suite which converts a PostScript file into a PDF file.

ADOBE ACROBAT PROGRAM: This is a software suite which facilitates the creation and access of PDF files. Adobe Systems Incorporated, 345 Park Avenue, San Jose, Calif. 95110-2704.

ADOBE SOFTWARE CONVERTER: This is a software program that extracts text from a Windows Help, HTML, or HTML file and creates an RTF file.

BUTTON: This is one of several kinds of interface items that can be displayed on a dialog by a Windows program A command button is chosen by the user to begin, interrupt, or end a process. When chosen, a command button appears pushed in, and is sometimes called a "push button."

CD-ROM (Compact Disk-Read Only Memory): This is a compact disk format used to hold text, graphics, and even high fidelity stereo sound. It is similar to an audio compact disk but uses a different track format for data. The audio CD player cannot play CD-ROMs, but CD-ROM players can usually play audio CDs. CD-ROMs hold in excess of 600 megabytes of data which is equivalent to about 250,000 pages of text or approximately 20,000 medium-resolution images.

CHM FILE: This is a Compiled Help file. This type of file is supported by Microsoft to replace Windows Help files.

CLIPBOARD: A temporary memory storage location supported by Microsoft Windows which allows a user to transfer text, graphics, code, etc., from one application to another.

ENGINE: This is the portion of the program that determines how the program manages and manipulates data. An engine differs from a user interface, with which the user communicates with the program, and it differs from other parts of a program, such as installation routines and device drivers, which enable the program to use a computer system and its components. The term "engine" is rarely used on its own and is more often mentioned in relationship to a particular program. For example, a database engine is the portion of a database management program that contains the tools for manipulating a database. A search engine would be that part of a program used to search and find a particular digital word or coded index.

FILE FORMAT: The structure of a file that defines the way it is stored and laid out on the screen or in print. The format can be fairly simple and common, as are the files stored as plain ASCII text, or it can be quite complex and include various types of control instructions and codes used by programs and by printers or other devices. Examples of formats include RTF (Rich Text Format); DCA (Document Content Architecture); PICT, DIF (data interchange format), DXF, TIFF (tagged image file format), and EPSF (Encapsulated PostScript Format).

FORMAT: This involves a structure or layout of an item. Screened formats are fields on the screen; report formats are columns, headers and footers on a page. Record formats are the fields within a record. File formats are the structure of data and program files, word processing documents and graphics files (display lists and bitmaps) with all their proprietary headers and codes.

FORMAT PROGRAM: This is software that initializes a disk. There are two formatting levels. The low level initializes the disk surface by creating the physical tracks and storing sector identifications in them. Low level format programs lay out the sectors as required by the particular type of drive technology used (IDE, SCSI, etc.). The high-level format creates the indexes used by the operating system (Mac, DOS, etc.) to keep track of the data stored in the sectors.

FULL-TEXT SEARCH: Full-Text search is a mechanism for searching for text in a collection of documents using various criteria. Adobe makes this available for files released on CD-ROM and Verity for files released on Web sites. It is necessary in both these cases to create auxiliary files to support full-text search. The user may search all documents or any subset of the documents using wildcards—for example, searching for "install*" will find all occurrences of install, installing, installation, installed, etc. The user may also use Boolean arguments—for example, searching for "installation and printers" will find all documents in which both the words "installation" and "printers" occur. Contrast full-text search with a simple find, in which the software scans all text in the document from the beginning looking for the indicated literal text.

HTM: This is a file name extension—for example, CONTENTS.HTM or INDEX.HTM. This extension is usually used to identify files read by an Internet browser, such as Internet Explorer or Netscape.

HTM EXTENSION: This is a Windows/DOS file name extension equal to HTM. For example, CONTENTS.HTM or INDEX.HTM. This extension is usually used to identify files ready by an Internet browser, such as Internet Explorer or Netscape.

HTML (Hypertext Markup Language): This is a standard for defining hypertext links between documents. It is a subset of SGML (Standardized General Markup Language).

HTML HELP: Microsoft HTML Help is the standard help format for Windows 98 and Windows 2000. It is much more capable than standard HTML, since it provides sophisticated features such as Dynamic HTML and ActiveX controls.

HYPERLINK: A hyperlink is a part of a page, whether the page is displayed from a CD-ROM or from a Web site, that the user can click with the mouse to perform some function, such as open a document, play a video, or display an external file.

HYPERTEXT: This is linking related information. For example, by selecting a word in a sentence, information about that word is retrieved if it exists, or the next occurrence of the word is found. This is also a metaphor for presenting information in which text, images, sounds, and actions become linked together in a complex, non-sequential web of associations that permit the user to browse through related topics regardless of the presented order of the topics. These links are often established both by the author of a hypertext document and by the user, depending on the intent of the hypertext document. For example, traveling among the links to the word "iron" in an article might lead the user to the periodic table of the elements or else a map of the migration of metallurgy in iron age Europe. The term "hypertext" was coined to described documents (as presented by a computer) that expressed the non-linear structure of ideas as opposed to the linear format of books, films, and speech.

INNERTEXT METHOD: This is a software mechanism to invoke the procedure called InnerText within the Microsoft ActiveX control that supports Internet Explorer. Extracts unformatted text from within the body of an HTML file.

NEXT HIT OPTION: This is an option provided by a search engine to facilitate navigation from one "hit," or found item, to the next. Ordinarily, the user performs a —search and the search engine presents the user with a "hit" list. This is a list of documents in which the items for which the user is searching can be found. When the user opens a document from the list, the first "hit" in the document is displayed. The user then moves to successive hits by selecting the next hit option.

ORIGINAL FILE: The concept of original file applies to the process described by this disclosure. In this case, it would be the Windows Help, HTML, or HTML Help file that is created to be released with the application. A utility reads the original file and creates a companion PDF file that consists of the unformatted text from the original file.

ORIGINAL PDF: This is a PDF file that was originally created to be delivered as a PDF file. It is usually a complete book, and it includes all graphics, special fonts, etc.

PDF COPY: This is a PDF file that was created from another type of file, such as Windows Help, HTML, or HTML Help. It contains only the text from the other file.

PDF FILES CREATED FROM TEXT EXTRACTED FROM OTHER FILE TYPES: The disclosure includes utilities that read the unformatted text from other types of files. The text is used to generate a PDF companion file of the original file that has links from each page into the corresponding location within the original file.

POSTSCRIPT DRIVER: This is Windows software which facilitates printing from a Windows application to a PostScript printer.

POSTSCRIPT FILE: This is a Windows file created by redirecting the commands generated by a PostScript driver to a file instead of to a printer. It can be copied to a PostScript printer or used by Adobe Acrobat Distiller to produce PDF files.

PREVIOUS HIT OPTION: This is an option provided by a search engine to facilitate navigation from one "hit," or found item, to the next. Ordinarily, the user performs a search and the search engine presents the user with a "hit" list. This is a list of documents in which the items for which the user is searching can be found. When the user opens a document from this list, the first "hit" in the document is displayed. The user then moves to successive hits by selecting the next hit option. Once the user has selected the next hit option, it is possible to return to the previous successive hit by selecting the previous hit option.

RTF: This is Rich Text Format, an adaptation of DCA (Document Content Architecture). This allows a user to transfer formatted text documents between applications, even those running on different platforms.

RTF FILE IN WORD: This is the process of opening an RTF file in Word. Word converts the RTF file into a Word document.

RTF PAGES: These are pages displayed in Word when it has an RTF file open. This allows the developer to see the separate pages.

SEARCH: This is the action of seeking the location of a file, or to search a file or data structure for specific data. A search is carried out by comparison or calculation to determine whether a match to some specified pattern exists or whether some other criteria have been met.

SEARCH ALGORITHM: This is an algorithm designed to locate a particular element, called a target in a list.

SEARCH TARGET: The search target is the text which defines what is being searched for. This could be a literal string of text which is to be found, such as "installation instructions," or a string containing wildcards, such as "install*", or a string containing Boolean instructions, such as "installation and printers."

SEARCH TERM: See "Search Target."

SENDKEYS: This is a function supported by Visual Basic and some other programs running under Windows that permits one software application to send keystrokes to another to simulate user input.

UNFORMATTED TEXT: This term refers to text that does not contain formatting information attributes, such as font name, point size, bold, italics, underline, etc., or does not possess the structure associated with tables, columns, indented paragraphs, etc.

VERITY SEARCH ENGINE: This is a software suite developed by Verity, and used on the Unisys Support Web site, that facilitates full-text search of files on a Web site. It includes both the software that the site administrator has to execute to create files necessary to support full-text search as well as the software that the user accesses to perform the searches. Verity Inc., 894 Ross Drive, Sunnyvale, Calif. 94089.

WINDOWS: This is an operating system introduced by Microsoft Corporation in 1983. Windows is a multi-tasking graphical user interface environment that runs on MS-DOS based computers. Windows provides a standard interface based on drop-down menus, windowed regions on the screen, and a pointing device such as a mouse. The programs used must be specially designed to take advantage of these features. A graphics-based operating system from Microsoft that provides a desktop environment similar to the Macintosh in which applications are displayed in re-sizeable moveable windows on a screen. Starting with Windows 95, the Windows system is a self-contained 32-bit operation system that requires a minimum Intel 386. In order to use all the features of Windows, applications must be written for this system.

WINDOWS HELP: Windows-based help systems are automated Windows utilities that provide procedural and system information to software users in lieu of paper-based documentation. Windows-based help supports context-sensitive help, which lets the user access topics in a help file that are relevant to the user's location in the application.

DESCRIPTION OF PREFERRED EMBODIMENT

FIG. 1A is a generalized drawing which illustrates the environmental modules which constitute the operating modules which permit the conversion of multiple-type files from a CD-ROM into Portable Document Format (PDF) files for observation on a observable window by the operator.

Figure 1B:
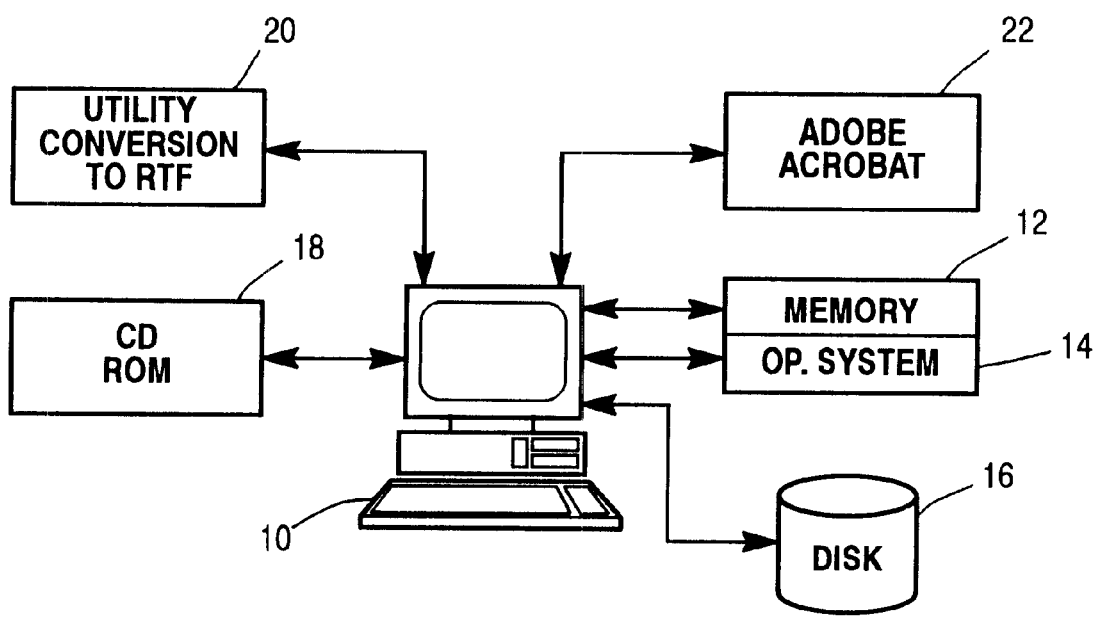
FIG. 1B is a block diagram illustrating the environmental modules utilized in conversion operations.

Now referring to FIG. 1B, a personal computer 10 is seen having a memory 12 and operating system 14 and is also connected to a disk storage unit 16.

A personal computer 10 is provided with an Adobe Acrobat program 22, and also includes a utility conversion module for converting files to Rich Text Format (RTF), the conversion module being designated 20.

A CD-ROM 18 is seen connected to the personal computer 10 and a CD-ROM may contain digital data in various different formats as a result of which it is often difficult to search for a given topic because of the various different formats on the CD-ROM.

The CD-ROM is often used in today's technology to replace operating manuals which used to be on printed paper documents. There may be many and multiple numbers of different documents on the CD-ROM 18 which provide multiple different files which can be shown in a directory. However, some of these files may be in one particular format, while others may be in different formats, thus instigating a problem when a browser or search engine is used in order to find a particular subject matter or topic on any one of the particular files.

FIG. 1A is an overall generalized drawing showing the basic steps in the creation of text copies from various types of CD-ROM files for conversion into Portable Document Format, or PDF files. For example, as seen in FIG. 1A, the Windows Help file (W1) is converted by a utility program (U2) into a Portable Document Format copy designated (WC).

Again, in FIG. 1A, a hypertext mark-up language file (HTML) designated as (M1) is passed through a utility program (U2M) after which there is provided at step (MC) a Portable Document Format copy of this particular file.

Further, in FIG. 1A, there is seen an HTML Help file (HH1) which is passed through a utility program (U2HH) in order to provide a Portable Document Format copy designated (HHC).

The original PDF file is designated as Opdf. This is the PDF file that was originally created to be delivered as a PDF file. It is usually a complete book, and includes all the graphic, special fonts, charts and other special arrangements, etc.

Figure 2:
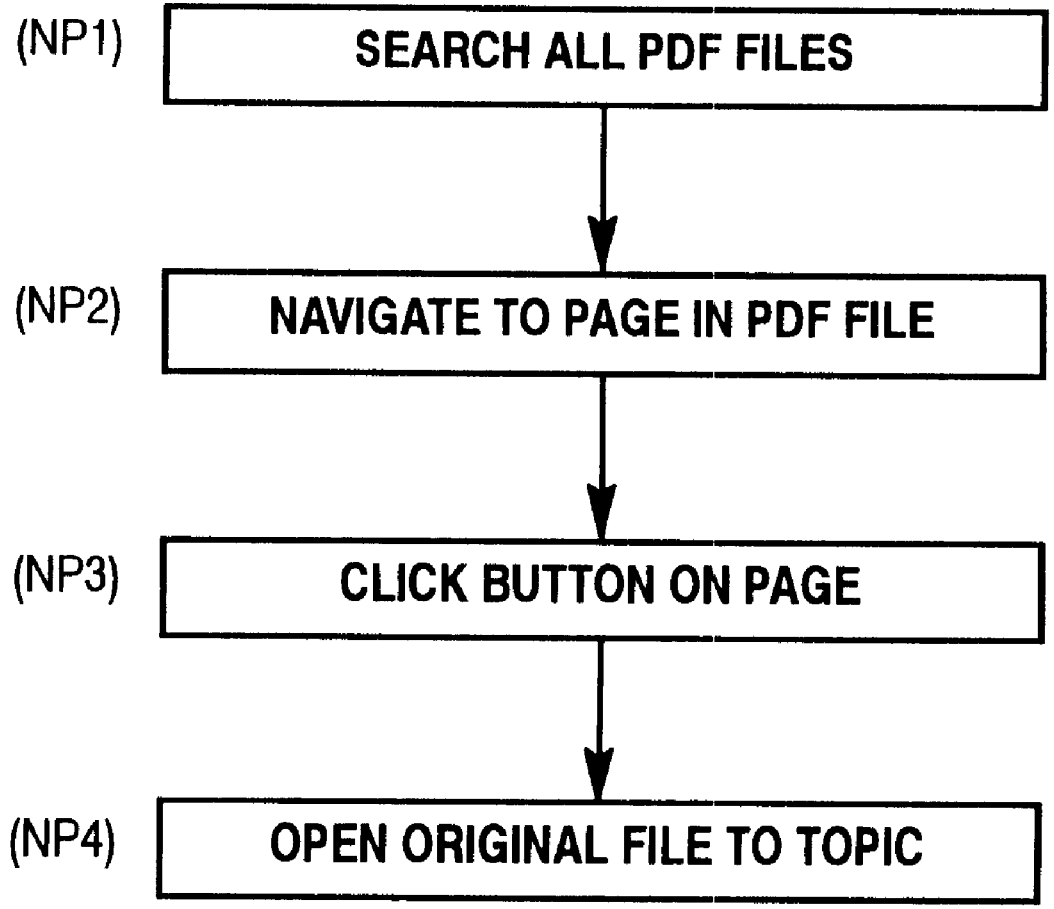
FIG. 2 is a schematic flowchart showing the method in searching non-portable document format files.

Now referring to FIG. 2, there is seen a generalized view for the searching of non-Portable Document Format files. Here, it is desired that a search be made on a particular topic such as "I/O" for example, in order to finally provide and display the data of the original file on that particular topic. Thus, as seen in FIG. 2, at step (NP1), there is instituted a search of all of the Portable Document Format (PDF) files.

Then, at step (NP2), the program will navigate to a particular page in the Portable Document File (PDF).

At step (NP3), the operator can click a button which appears on that particular page that is displayed, and then at step (NP4), the operator can open the original file to the selected topic, for example, such that the original topic, such as (I/O) will now be displayed and seen in its original file form.

Figure 3:
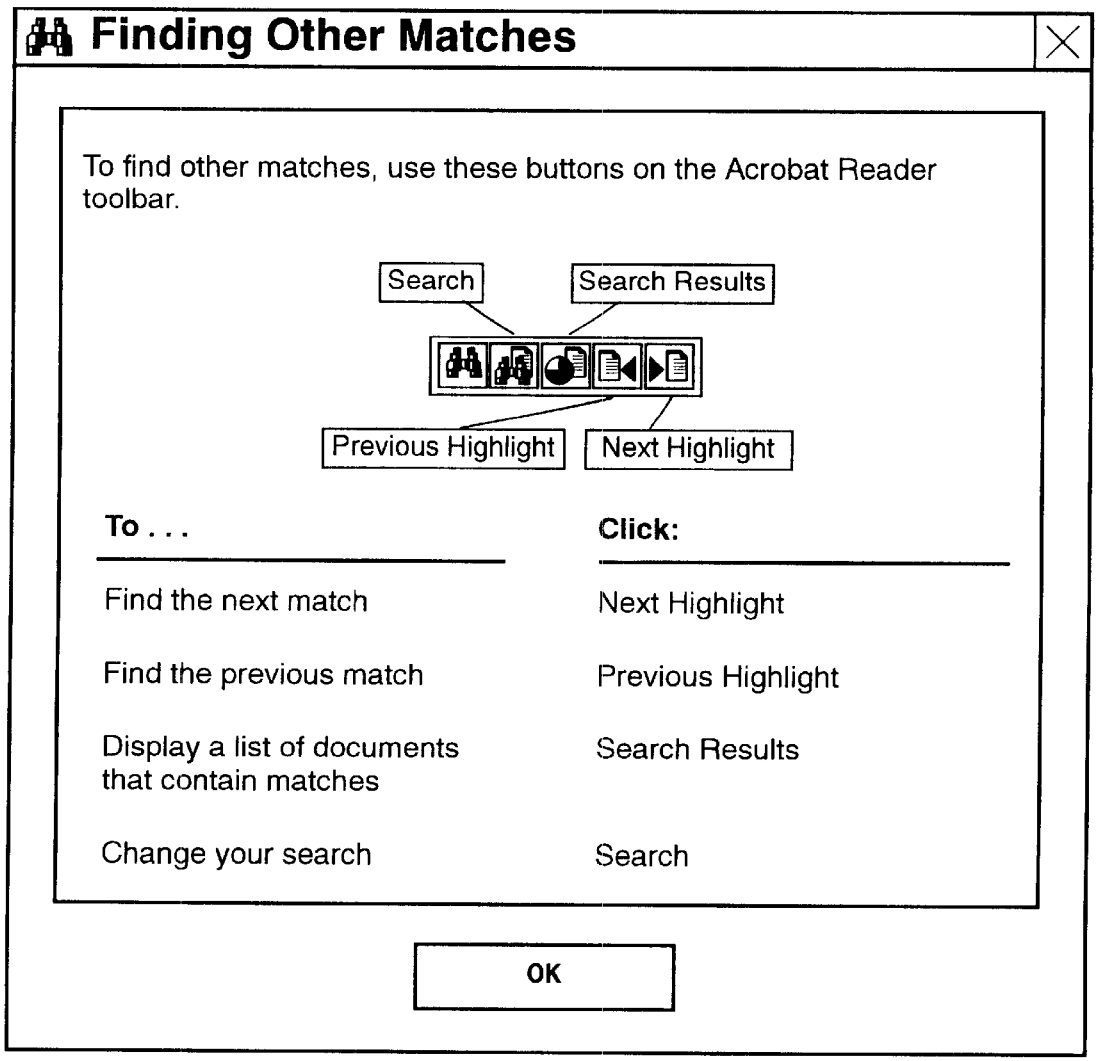
FIG. 3 is a representation of a window which indicates messages to the operator for finding other matches.

FIG. 3 is a schematic drawing of a window which can be observed by the operator which can be found on the Acrobat Reader tool bar in regarding to finding other matches.

Seen on this window is a set of icons, one of which can be pressed for "search" and another icon which can be pressed for search results. Then, there is another icon which shows a way to find the previous match and highlight the previous match, in addition to an icon used to find the next match and highlight the next match.

The search results icon will provide a display of a list of documents that contain matches, while the search icon is used to change the search topics.

Figure 4:
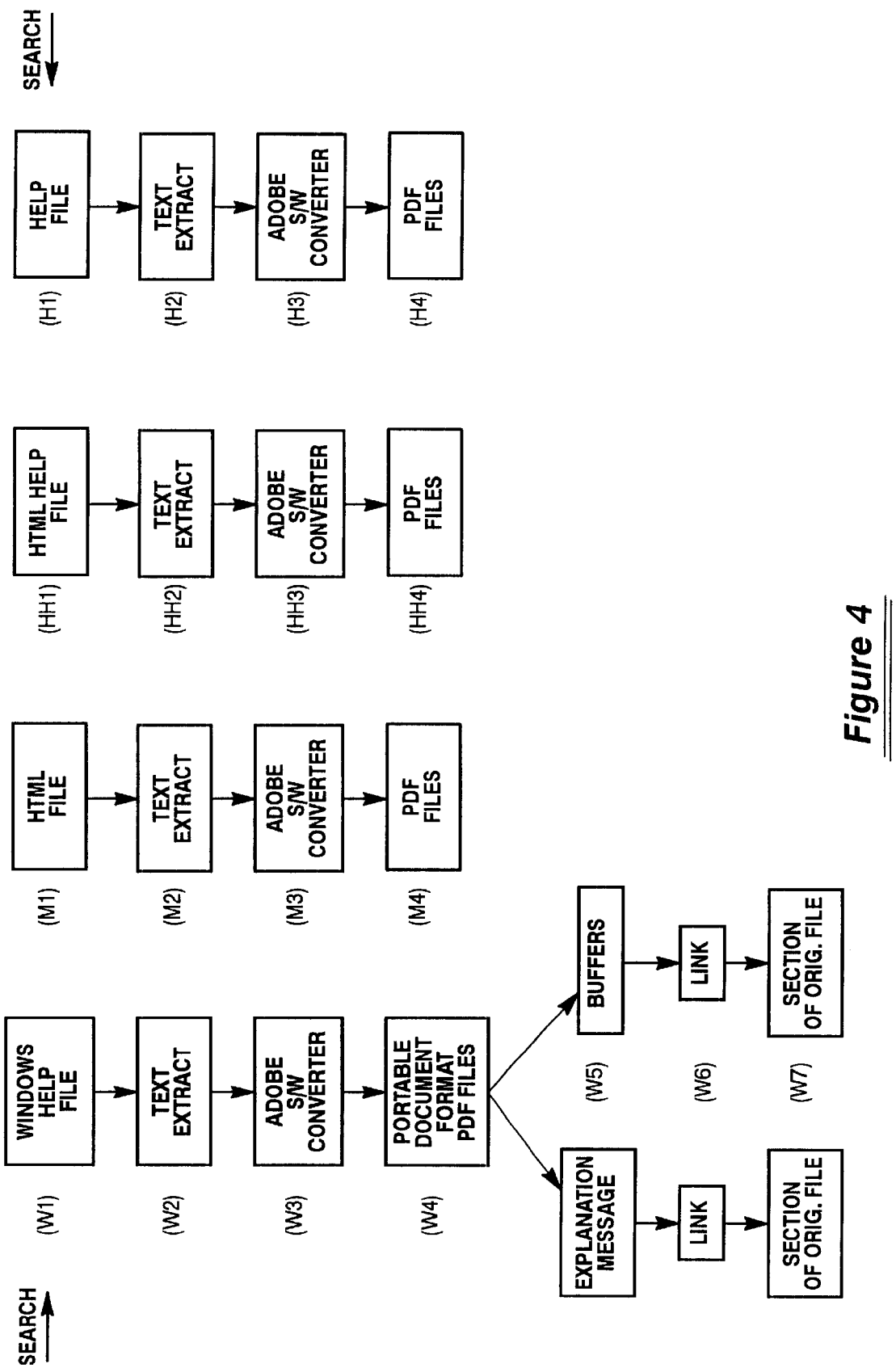
FIG. 4 is a drawing showing the basic steps involved in converting files from various different formats into PDF files and then linking them to desired portions of the original file.

FIG. 4 is a slightly more detailed drawing of sets of flow charts showing the basic steps involved in converting files from various different formats into PDF files and then with subsequent linking of these files to desired portions of the original file.

A sequence of original files are shown which are to be the object of a search. The Windows Help files are designated W1 and the HTML files are designated M1, while the HTML Help files are designated HH1, and the Help file is designated H1.

The next step involved respectively, for each of these files is the extraction of text. This is shown respectively, as block W2, M2, HH2, and H2, which represents in each case the factor of extracting the text of a particular topic or subject matter.

The next level of steps shown respectively, as W3, M3, HH3, and H3, all involve the step of conversion with use of the Adobe Acrobat software converter.

Then, the next respective sequence of steps involves step W4, M4, HH4, and H4 which involve the development of the Portable Document Format, or PDF files.

Then in FIG. 4, there is seen step W5 which involves two separate functions, one of which is the set of buffers to hold the PDF files, together with an explanation message regarding the files in the buffer. An example of an explanation message and a link created by this program are shown in the left panel of FIG. 10.

Then at step W6, a link occurs from the explanation message and buffers of step W5 in order to provide for step W7 which locates and displays the appropriate section of the original file on the topic matter that was desired.

As will be seen in the next succeeding set of drawings, it should be understood that there are certain intermediate steps involved, whereby the original files are first converted to Rich Text Format (RTF), after which the subsequent RTF files can then later be converted to Portable Document Format (PDF).

Figure 5:
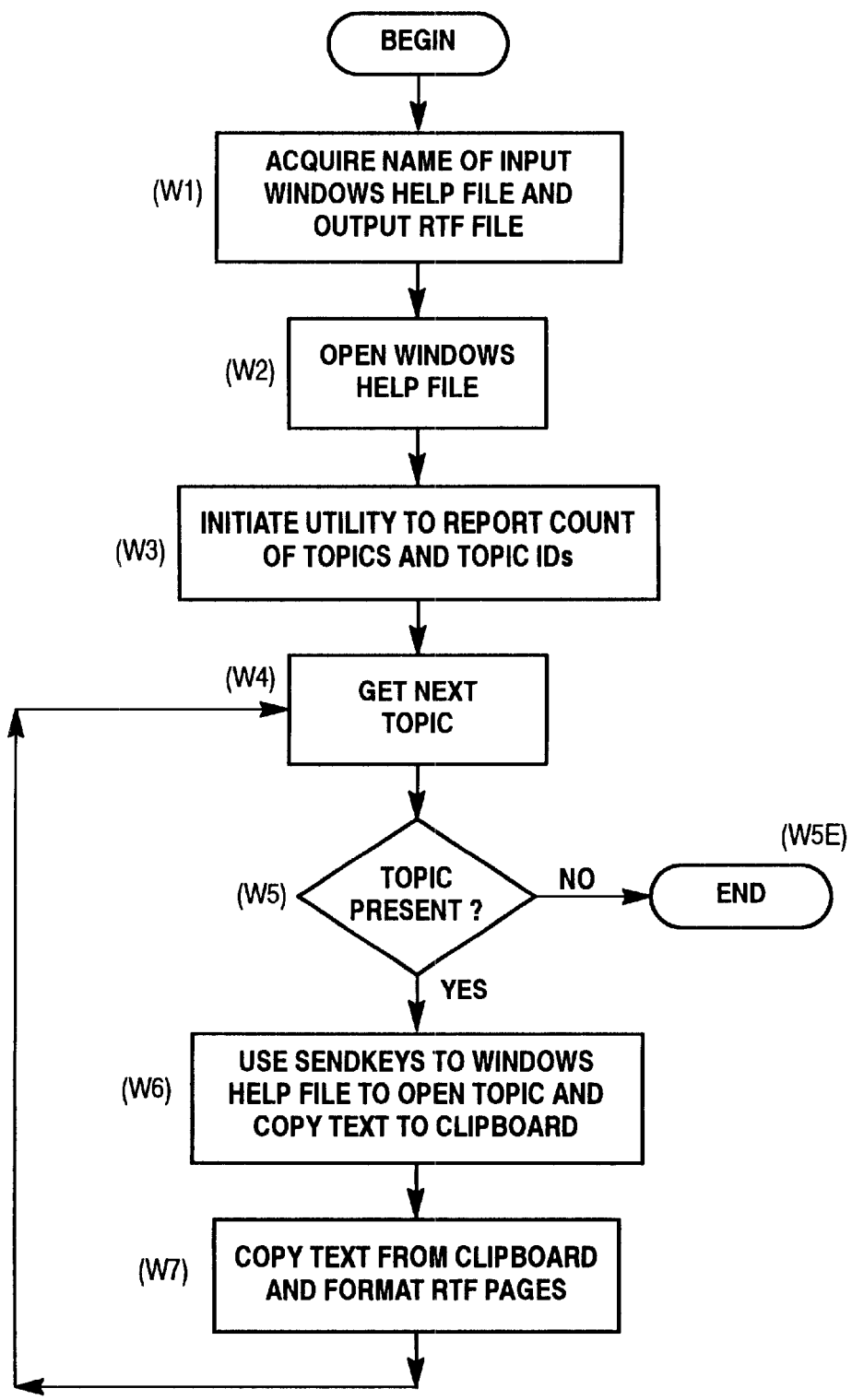
FIG. 5 is a flow chart illustrating the us conversion of a Windows Help File into Rich Text Format (RTF)

Now, there is seen in FIG. 5 which shows the various steps in flow chart form, for converting the Windows Help file to Rich Text Format. Starting at step W1, the program will acquire the name of the Input Windows Help file and the name of the Output Rich Text Format file.

At step W2, the program will open the Windows Help file.

At step W3, the program will initiate a utility to report the count of topics and topic IDs. A Windows Help file is composed of a collection of individual topics. Every topic has a number, from 1 through the total number of topics. Each topic can have a Topic ID: for example, "Using Boolean Expressions in Acrobat Searches". This step generates a list which is used by subsequent steps in the process to read every topic in the Windows Help file that has a topic ID.

At step W4, the program will then go to the list to read the number of the next topic that has a Topic ID. For example, this next topic might be the subject of "channel adapters".

At step W5, a decision block is presented to query whether or not additional topics are present. If there are no additional topics, then the program will end at step W5E. On the other hand, if a topic is present (YES), then step W6 occurs where the program will use SENDKEYS to the Windows Help file to open the topic up and copy the text from that topic into the Clipboard.

Then at step W7, the program will copy the text from the Clipboard and format the Rich Text Format pages, after which there is a return to step W4 in order to get the text from the next topic.

Figure 6:
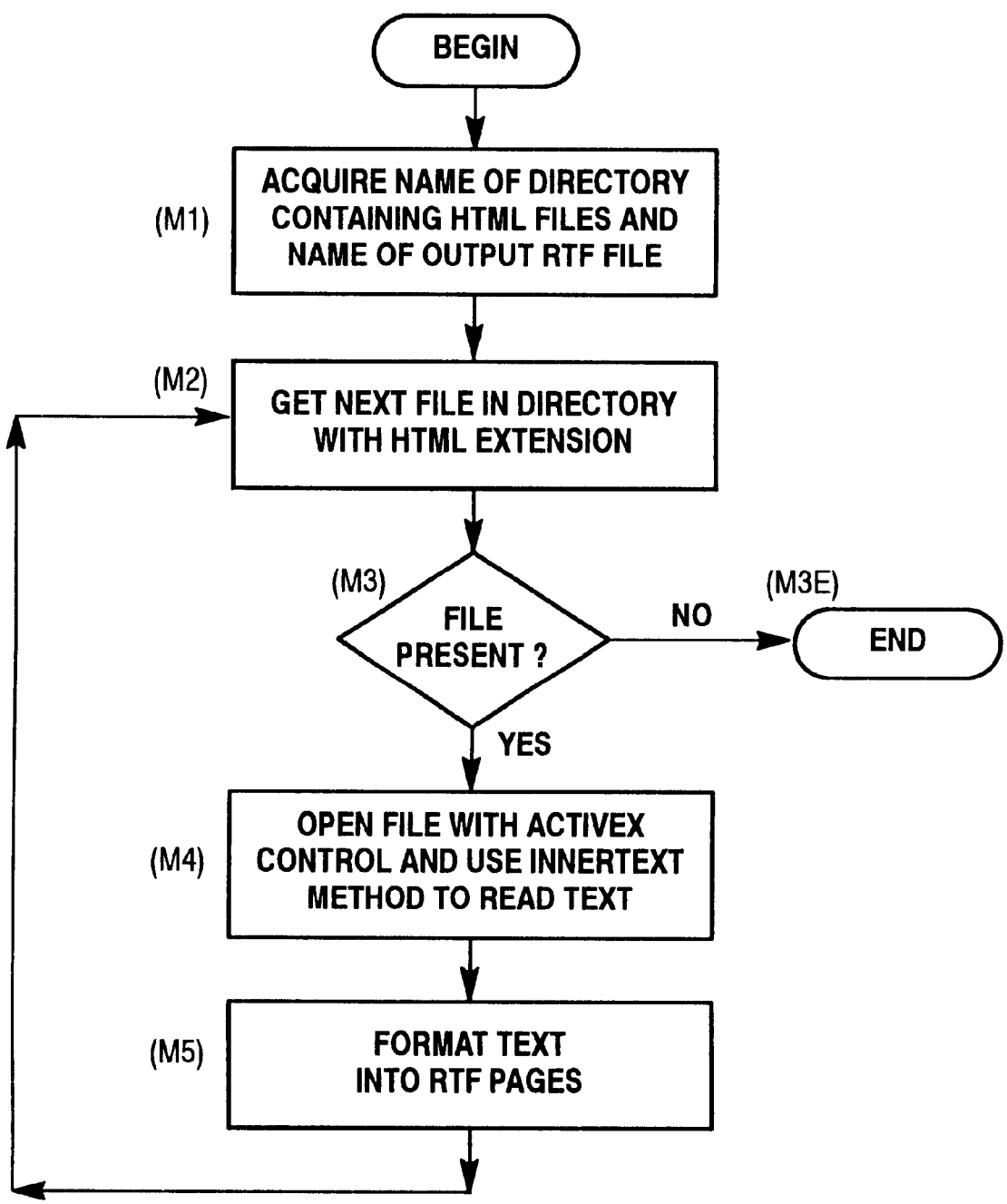
FIG. 6 is a flow chart illustrating the conversion of HTML files to Rich Text Format (RTF)

FIG. 6 is a flow chart illustrating the steps involved for converting the HTML files to Rich Text Format (RTF). At step 1, the program will acquire the name of the directory containing the HTML files and also the name of the Output Rich Text Format (RTF) file. Note that an HTML "document" can consist of a number of files with the HTM extension.

Then at step M2, the program will get the next file in the directory with the HTM extension. This is a Windows/DOS file name extension, which is equivalent to HTM, as for example, CONTENTS.HTM or INDEX.HTM. This extension is usually used to identify files read by an Internet browser, such as Internet Explorer or by Netscape.

At step M3, a decision block is presented which presents the query as to whether or not another file with the HTM extension is present. If the answer is (NO), then the program will end at step M3E. If the answer is (YES) at step M3, then step M4 occurs to open the particular file with the ActiveX control which will use the Innertext method to read the text. InnerText is a software mechanism within the Microsoft ActiveX control that supports Internet Explorer and will extract unformatted text from within the body of a HTML file.

Then, at step M5, the program will format the Text into Rich Text Format pages (RTF).

After step M5, the program loops back to step M2 to get the next file in the directory with the HTM extension.

Figure 7:
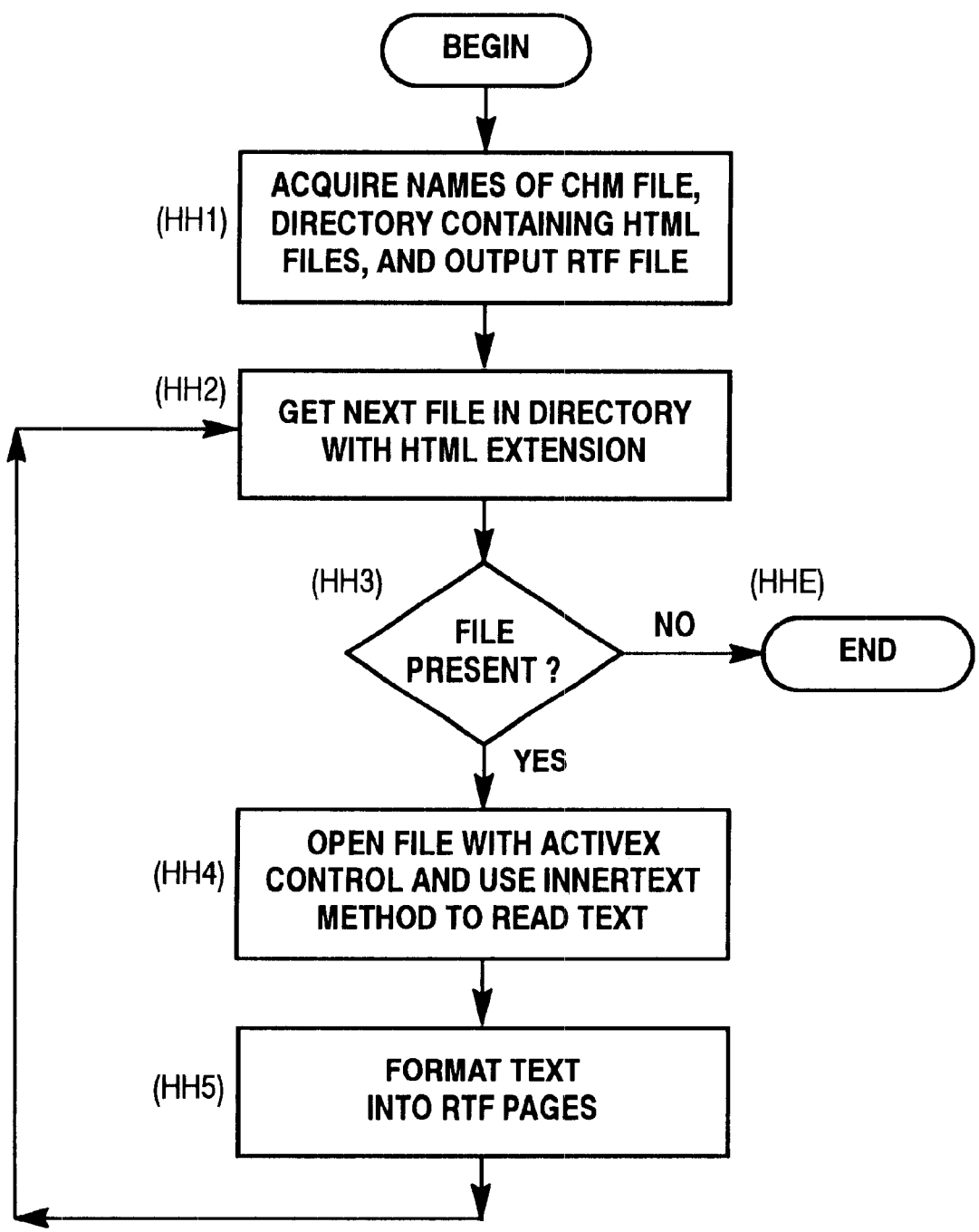
FIG. 7 is a flow chart showing the conversion of an HTML Help file to Rich Text Format (RTF)

FIG. 7 is a flow chart illustrating the conversion of an HTML Help file into a Rich Text Format (RTF) file. An HTML Help file is also called a CHM file or a compiled Help file. This is a type of file supported by Microsoft and used to replace Windows Help files. A CHM file is constructed from a collection of HTML files.

Here at step HH1, the program will acquire names of the CHM file directory, which contains the HTML files from which the CHM file is constructed and the Output RTF file to be created by the program.

At step HH2, the program will get the next file in a directory with the HTM extension. The extension is used to identify files read by an Internet browser.

At step HH3, a query block is presented to query whether an additional file with an HTM extension is present. If the answer is (NO), then the program ends here at step HHE. If the answer is (YES), that is to say, a file is present, then at step HH4, the program will open the file with the ActiveX control and use the Innertext method to read the text. This copies unformatted text from within the body of a HTML file. Graphics, font information, such as point size, bold, italic, etc., and structure, such as tables, columns, etc., are not copied.

Then at step HH5, the extracted text is operated on to format the text into Rich Text Format (RTF) pages.

After this, the program loops from HH5 back to HH2 in order to operate on the next file in the directory.

Figure 8:
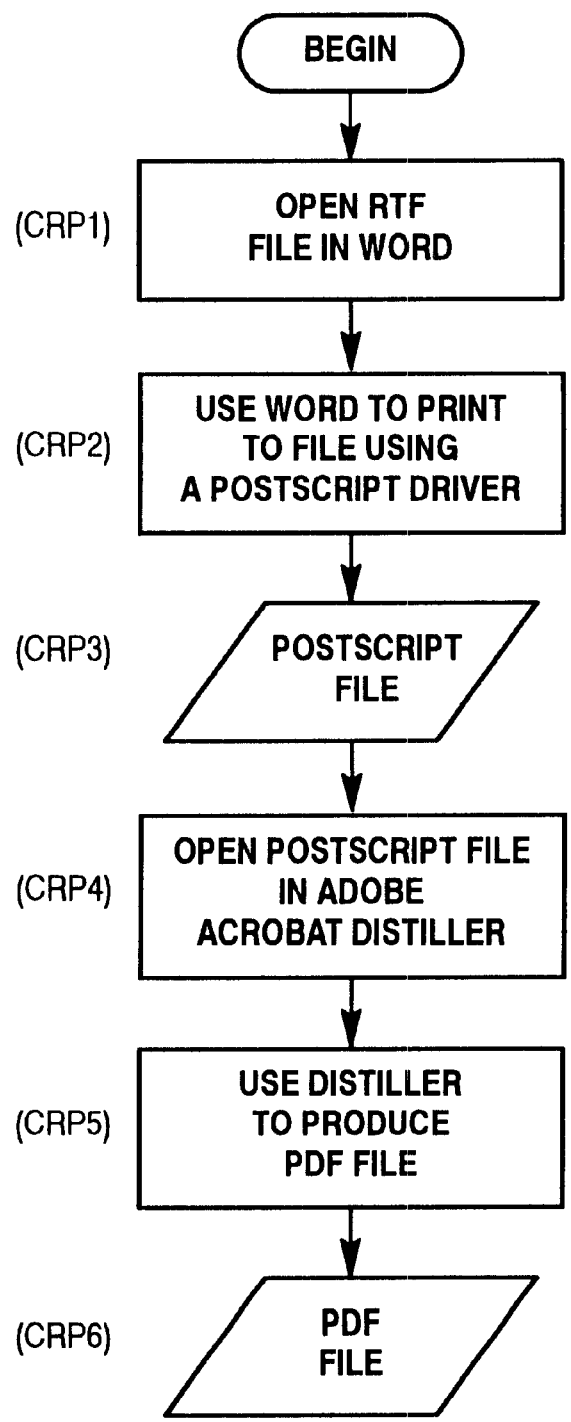
FIG. 8 is a flow chart showing the conversion of a Rich Text Format file to Portable Document Format (PDF) files.

As was previously discussed, the Rich Text Format files are a kind of intermediate file which eventually must be converted to a portable document format, or PDF file. FIG. 8 is a flow chart showing the steps involved for converting the Rich Text Format file to the Portable Document File.

At step CRP1, the program will open the Rich Text Format file in Word so that the Word program of Microsoft will convert the Rich Text Format file into a word document.

At step CRP2, the program will use the Word program to print to file, using a PostScript driver. The PostScript driver is a portion of Windows software which facilitates printing from a Windows application to a PostScript printer.

At step CRP3, there is developed a PostScript file which is a Windows file created by redirecting the commands generated by a PostScript driver to a file, instead of to a printer. The file can be copied subsequently to a PostScript printer or just used by the Adobe Acrobat Distiller to produce Portable Document Format files.

At step CRP4, the program will open the PostScript file in the Adobe Acrobat Distiller.

At step CRP5, the program will use the Adobe Acrobat Distiller to produce the Portable Document Format files.

With the development of the PDF file as shown in FIG. 8, the Portable Document File can now relate to FIG. 4 which shows the level of Portable Document Format files seen at steps W4, M4, HH4, and H4.

Then, as was illustrated in FIG. 4 through steps W5, W6 and W7, the files are placed in buffers with an explanation message and then linked to the appropriate sections of the original file for display of the topic material in its original format with all its graphics, lists, drawings, and any unusual factors that appeared in the original file.

Figure 9:
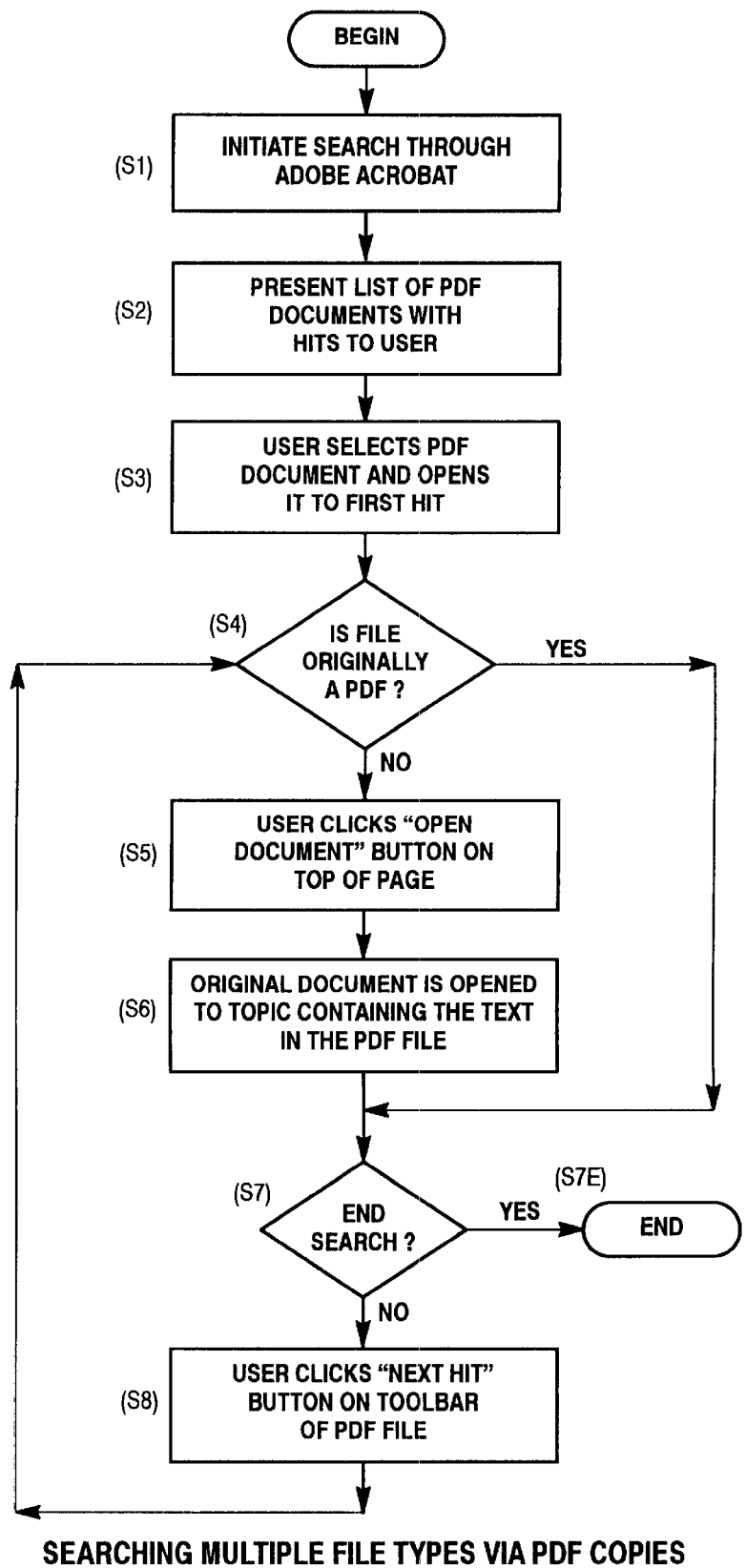
FIG. 9 is a flow chart illustrating a search which can be instituted on the PDF files after multiple file types have been converted to PDF.

This can further be expounded by the flow chart seen in FIG. 9, where now that the Portable Document Format (PDF) copies have now been isolated, then a search can be initiated using the Adobe Acrobat programs.

Now referring to FIG. 9 at step S1, the program will initiate a search of a particular topic through the Adobe Acrobat program.

Then at step S2, there is presented a list of the Portable Document Format (PDF) documents, showing the list of hits to the user.

At step S3, the user selects a Portable Document Format document and opens it to the first hit.

At step S4, a decision box is initiated to query of whether the file is originally a Portable Document File. If the answer is (YES), then the program sequence is to step S7 to query whether the search should end.

At step S4, if the answer is (NO), that is to say, the file is not originally a Portable Document Format file, then at step S5 the user will click the "Open Document" button on the top of the display page.

At step S6, the original document is now opened to the particular topic containing the text in the Portable Document Format file.

At step S7, a decision box presents the question of whether this is the end of the search. If the answer is (YES), the search ends at step S7E. If it is not the end of the search (NO), then step 8 occurs where the user clicks the "next hit" button on the tool bar of the Portable Document Format file.

Then, step S8 loops back to step S4 in order to continue through S5, S6 and S7 until the search has ended at S7E.

Figure 10B:
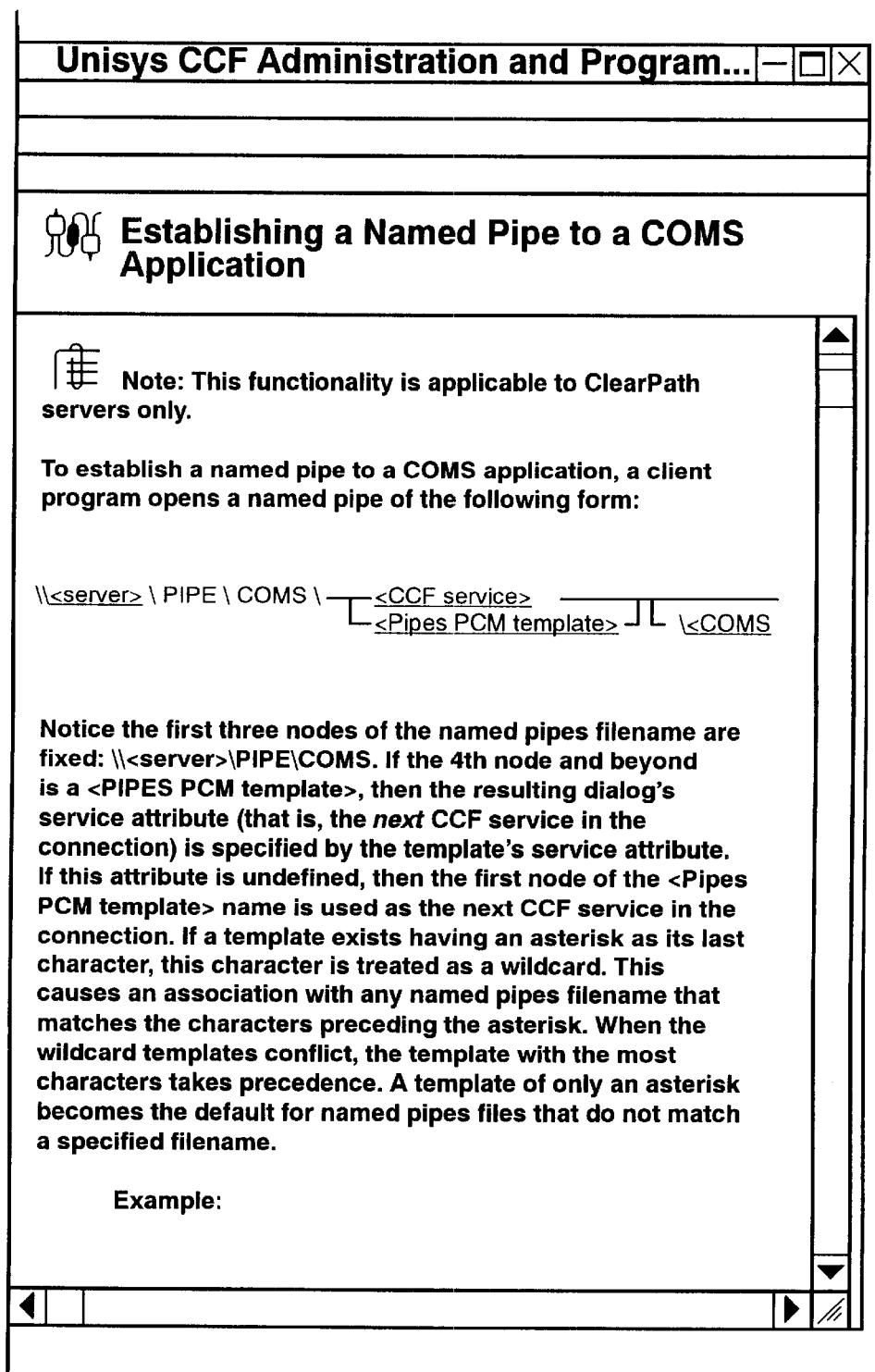
FIG. 10 is a set of selected topic files side-by-side indicating one topic file in PDF copy format and the same topic file in original copy format.
Figure 10B:
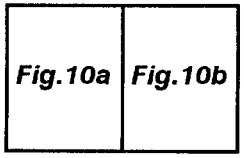

Now referring to FIG. 10, there is illustrated a page of unformatted text which is shown on the left side of the page, and its corresponding original file which is indicated on the right-hand side of the page.

As an example, the subject matter was that of "Establishing a named pipe to a COMs Application". Here, it will be noticed that the unformatted text does not contain all the information, such as graphics, etc., but that the original file shown on the right-hand side shows the original text together with the graphics and detailed material which may not appear in the unformatted text.

Thus, it can now be understood that a series of books or manuals can be placed on a CD-ROM and exist in different types of formats. This normally would make it unwieldy or impossible to search through the entire CD-ROM in order to get information on a particular topic that was desired since any particular browser is specific to the handling of any one particular format, but not available or useful in handling many different types, or multiple types of formats.

Thus, the present system, by using the intermediate step of providing the Rich Text Format which can then be converted to the Portable Document Format, and then the Portable Document Format is compatible with and accessible to search purposes by use of the Adobe Acrobat program, so that the multiple numbers of different files, documents or booklets residing on the CD-ROM can now be searched for a given topic and then displayed in Portable Document Format (PDF).

Then subsequently, the Portable Document Format (PDF) can then be linked back to the original text of the original pages holding the desired topic information desired by the user and these can be displayed in their original format with full graphics, colors, lists, tables and any other types of display which would not be available in the PDF format.

While a particular implementation of the above-described invention has been shown in a particular effective implementation, there may be other implementations of the invention which are derivable from the disclosed material, but which still are encompassed by and fall within the scope of the attached claims.

What is claimed is:

1. A method for searching a selected topic residing in multiple files on a CD-ROM wherein said files reside in different format, comprising the steps of:
   (a) converting each of said multiple files into a common format; which includes the steps of:
      (a1) converting each of said files into a Rich Text Format (RTF);
      (a2) converting each of said RTF files into a Portable Document Format (PDF);
   (b) searching each of said commonly formatted files for hits on a designated topic;
   (c) linking said hit pages of said designated topic to pages which copy the original file;
   (d) selecting a PDF page which had a hit on the selected topic;
   (e) opening the original document to the topic containing the text in the PDF file via a link from the PDF file to the original file.

2. The method of claim 1 wherein step (b) includes the steps of:
   (b1) utilizing an Adobe Acrobat program to search each of said multiple files in said (PDF) Portable Document Format in order to find hits on a designated topic.

3. The method of claim 2 wherein step (b) includes the step of:
   (b2) presenting a list of PDF documents showing hits to the user.

4. A system for searching files residing on a CD-ROM in multiple formats in order to locate a specific topic which can be viewed in its original form comprising:
   (a) CD-ROM means holding multiple files which reside in different formats;
   (b) means to convert each of said multiple files into a common format suitable for a compatible browser; including
      (b1) means for converting each of said files into a Rich Text Format (RTF);
      (b2) means for converting each of said RTF files into a Portable Document Format (PDF);
   (c) means to search said commonly formatted files to locate a designated topic area for initial viewing on a computer screen;
   (d) means to link said designated topic area of said commonly formatted file to an original copy of said designated topic area;
   (e) means for selecting a PDF page which had a hit on the selected topic;
   (f) means for opening the original document to the topic containing the text in the PDF file via a link from the PDF file to the original file.

5. The system of claim 4 wherein said CD-ROM means holds files of manuals and documents residing in different file formats.

6. The system of claim 4 wherein said CD-ROM means includes a directory listing the manuals and documents residing on said CD-ROM.

7. The system of claim 4 wherein said means to search includes:

(c1) means to initiate a topic search of said PDF files;

(c2) means to present a list of PDF documents showing hits on the designated topic.

8. The system of claim 7 wherein said means to present includes:

(C2a) means to select a PDF document which was indicated as having a hit;

(c2b) means to open said selected PDF document.

9. The system of claim 8 wherein said means to present includes:

(c2c) means to link said PDF hit document to a copy of said original file to enable a viewer to see the selected topic area in its original form.

\* \* \* \* \*